United States Patent
Eriksson et al.

(10) Patent No.: US 7,792,626 B2
(45) Date of Patent: Sep. 7, 2010

(54) ENGINE ARRANGEMENT

(75) Inventors: Soren Eriksson, Kungalv (SE); Jan Lundgen, Vastra Frolunda (SE)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 12/324,350

(22) Filed: Nov. 26, 2008

(65) Prior Publication Data

US 2009/0150043 A1 Jun. 11, 2009

(30) Foreign Application Priority Data

Dec. 6, 2007 (EP) .................................. 07122549

(51) Int. Cl.
*B60W 10/00* (2006.01)
*F02D 45/00* (2006.01)
*G06F 19/00* (2006.01)

(52) U.S. Cl. ................. 701/102; 701/115; 123/DIG. 8; 477/6

(58) Field of Classification Search ................. 701/102, 701/115, 114, 22; 123/198 F, DIG. 8; 477/6, 477/2, 181
See application file for complete search history.

(56) References Cited

U.S. PATENT DOCUMENTS

| | | | |
|---|---|---|---|
| 4,368,701 A | 1/1983 | Huber et al. | |
| 4,421,217 A | 12/1983 | Vagias | |
| 4,439,989 A | 4/1984 | Yamakawa | |
| 5,092,293 A | 3/1992 | Kaniut | |
| 6,814,686 B2 * | 11/2004 | Carriere et al. | 477/6 |
| 6,935,115 B2 * | 8/2005 | Anderson | 123/DIG. 8 |
| 7,300,385 B2 * | 11/2007 | Cherry et al. | 477/181 |
| 2005/0126173 A1 | 6/2005 | Anderson | |
| 2009/0314559 A1 * | 12/2009 | Palitto | 180/65.22 |

FOREIGN PATENT DOCUMENTS

| | | |
|---|---|---|
| EP | 1731346 | 12/2006 |
| EP | 07122549 | 12/2007 |
| JP | 57113935 | 7/1982 |

OTHER PUBLICATIONS

ISA European Patent Office, International Search Report of EP07122549, May 21, 2008, 2 pages.

* cited by examiner

*Primary Examiner*—Hieu T Vo
(74) *Attorney, Agent, or Firm*—Allan J. Lippa; Alleman Hall McCoy Russell & Tuttle LLP

(57) ABSTRACT

A method for operating an engine arrangement with a first internal combustion engine and a second internal combustion engine in a vehicle is provided. The method may include partially coupling a first crankshaft of the first internal combustion engine in the vehicle with a second crankshaft of the second internal combustion engine in the vehicle to start the second internal combustion engine, where the first crankshaft and second crankshaft are partially coupled with a clutch. The method may further include decoupling the first and second crankshaft when the second engine is operating under its own power. The method may further include coupling the first crankshaft and the second crankshaft, where the first and second crankshafts are coupled with the clutch when a speed difference between the first and second crankshafts is below a predetermined value and a relative angular position between the first and second crankshafts is less than 360°.

19 Claims, 5 Drawing Sheets

ENGINE ARRANGEMENT

CROSS REFERENCE TO PRIORITY APPLICATION

This present application claims priority to European Application Number 07122549, filed Dec. 6, 2007, entitled "Engine Arrangement", naming Soren Eriksson and Jan Lundgren as inventors, the entire contents of which are incorporated herein by reference.

TECHNICAL FIELD

The present invention relates generally to control of engine arrangements comprising a first and a second internal combustion engine, wherein each engine comprises a crankshaft and at least one cylinder with a piston connected to said crankshaft, a controllable friction clutch arranged between the crankshafts.

BACKGROUND

Engine arrangements using dual displacement engines, which are connected, to vary the number of active cylinders in a four-cycle internal combustion engine has been suggested as a possible solution for reducing fuel consumption for future vehicles.

U.S. Pat. No. 4,421,217 discloses an arrangement for connecting coaxial crankshafts in order to change the number of active cylinders in an internal combustion engine. According to this arrangement, a friction clutch is operated to start and connect the crankshafts. A problem with this solution is that a second engine is started by actuating a clutch driven by a first engine, and the clutch is then maintained in positive engagement. As the relative angular position of the crankshafts is not considered, subsequent operation of the connected engine is almost certain to experience problems with noise, vibration and harshness (NVH).

One object of the present invention is to provide an improved arrangement for connecting crankshafts in order to change the number of active cylinders in an internal combustion engine. A further object of the invention is to achieve synchronization of the engines to be connected using existing engine-related parameters, without the need for additional sensors.

SUMMARY

The above problems have been solved by a method and an engine arrangement according to the present disclosures.

According to an embodiment, the invention relates to an engine arrangement and methods for operating an engine arrangement with a first internal combustion engine and a second internal combustion engine in a vehicle. One example method may include partially coupling a first crankshaft of the first internal combustion engine in the vehicle with a second crankshaft of the second internal combustion engine in the vehicle to start the second internal combustion engine, where the first crankshaft and second crankshaft are partially coupled with a clutch. The method may further include decoupling the first and second crankshaft when the second engine is operating under its own power. The method may further include coupling the first crankshaft and the second crankshaft, where the first and second crankshafts are coupled with the clutch when a speed difference between the first and second crankshafts is below a predetermined value and a relative angular position between the first and second crankshafts is less than 360°. In this way, it is possible to couple the engines and obtain a desired firing order between the cylinders of the first and second engine.

The relative angular position of the crankshafts of the first and second engines can be determined using a first set of position sensors. A similar, second set of position sensors may be used to determine the relative angular position of the camshafts in relation to their respective crankshaft for the first and second engines. In a four-cycle Otto or Diesel engine, the camshaft will rotate at half the speed of the crankshaft. The output signals from the first and second set of position sensors are transmitted to the electronic control unit, which may be an engine control unit (herein referred to as the ECU), where the signals are compared and processed using a software algorithm to find the optimal local alignment between the two output signals. In this case, the optimal alignment is the synchronization of the two crankshafts at a relative angle of 720°. The relative angle of 720° corresponds to two complete relative revolutions of the crankshafts, which corresponds to a relative position where the engines are firing alternately. Processing the signals using a software algorithm provides a "fused" sensor signal representing a 0-720° value. The ECU may then control at least the second engine in order to synchronize the crankshafts at a relative angle of 720°. When the desired relative angular position is detected, the clutch is actuated to connect the two engines.

The method may further involve connecting or securing the crankshafts of the first and second engines in a predetermined relative angular position using a mechanical connecting means (e.g., a mechanical connector). The mechanical connecting means may be arranged to connect the crankshafts prior to, at the same time as, or subsequent to the actuation of the friction clutch. By way of example, the mechanical connecting means may comprise a ratchet that is preferably, but not necessarily, mounted on the crankshaft of the first engine. Further examples of mechanical connectors may include an overrunning clutch or a dog clutch that can be connected at a specific relative angle between the crankshafts.

The crankshafts may be connected using a ratchet of the overrun type, or using a controllable ratchet that is actuated when the speed difference between the first and second crankshafts is below a predetermined value and the relative angular difference between the crankshafts is less than 360°, where 720° is considered a complete cycle for a four-stroke engine.

The ECU may be used for determining that the ignition sequence of the first and second engines corresponds to a predetermined ignition sequence prior to connecting the crankshafts of the first and second engines in a predetermined relative angular position. The first and second engines may be operated using different ignition sequences adapted for each individual engine. In order to ensure smooth operation of the engine arrangement, the ignition timing of the first and second engines should preferably be synchronized to correspond to the ignition timing of the combined engines with the crankshafts connected. For instance, the first and second engines may comprise engines with any suitable combination of cylinders. Examples of suitable combinations of numbers of cylinders in the respective engines may comprise, but are not limited to, 2+2, 3+3, 4+4, or any other combination of odd or even number of cylinders. For example, an eight cylinder engine may comprise a pair of in-line four cylinder engines. When operating separately prior to being connected, the first and second engines have an ignition sequence that is optimized for an in-line four cylinder engine. In order to achieve an ignition sequence that is optimized for an in-line eight cylinder engine, the ECU uses the ignition timing sequence of the respective first and second engines to control the relative angular position of the first and second crankshafts. As described above, the ignition sequence may be determined using the relative camshaft positions of the two engines. The crankshafts may be positioned and locked together in at least one position. In this case the crankshafts are preferably connected at a relative angle of 720°, or a multiple thereof. This corresponds to two complete relative revolutions of the crankshafts, which corresponds to a relative position where the engines are firing alternately. Such an arrangement may be used for all types of four-cycle engines combined as described above. According to the invention, the preferable method involves using a friction clutch for locking up the crankshafts.

According to a further embodiment, the method involves starting the second engine by partially actuating the controllable clutch. In order to avoid or, at least, minimize a sudden jerk in the transmission during start-up of the second engine, the ECU initiates a partial actuation, allowing the friction clutch to slip while the crankshaft of the second engine is accelerated from standstill. At the same time, the ECU will actuate the ignition system and fuel injection system of the second engine. In this way, an electric starter motor is not necessary for the second engine since the torque produced by the first engine is transmitted through the clutch to start said second engine. In order to substantially eliminate or, at least, to reduce an operator's feeling of torque loss from the first engine during start-up of the second engine, the torque output from the first engine may be controlled to increase temporarily while the clutch is being operated.

The ECU will monitor at least one engine-related parameter for the second engine, in order to disengage the controllable friction clutch when a total desired output torque of the first and second engines is below a predetermined limit. The second engine will then accelerate under its own power towards the engine speed of the first engine, under the control of the ECU.

The invention further relates to an engine arrangement comprising a first internal combustion engine and a second internal combustion engine, wherein each of the first and second engines comprises a crankshaft and at least one cylinder with a piston connected to said crankshaft, a controllable clutch arranged between the crankshafts, an engine control unit connected to and controlling the first and second engine, and sensors for monitoring at least one engine-related operating parameter. The second engine is configured to be started when a demand for output torque exceeding an available output torque from the first engine is detected. The ECU is configured to compare a first engine speed of the first engine and a second engine speed of the second engine, and to control the second engine to minimize the speed difference between the first and the second engine speed. The ECU is further configured to control the relative angular position of the first and second crankshafts in relation to a sensed crankshaft and/or camshaft position and the ignition timing sequence of the respective first and second engines. The controllable clutch is configured to be actuated to lock up the crankshafts of the first and second engines in at least one predetermined relative angular position. The controllable clutch is preferably a friction clutch.

The arrangement may comprise a mechanical connecting means, such as a ratchet on the crankshaft of the first engine, as described above. The mechanical connecting means is arranged to connect the crankshafts of the first and second engines in a predetermined relative angular position.

A ratchet connecting the crankshafts may be an overrun ratchet or a controllable ratchet that is arranged to be actuated when the speed difference between the first and second crankshafts is below a predetermined value and the relative angle between the crankshafts is 720° or a multiple thereof. In order to ensure this, the mechanical connecting means, configured to connect the crankshafts of the first and second engines, may be actuated only when the angular difference between the crankshafts is less than 360°, that is, within the window for achieving a relative angle of 720° between the crankshafts.

The ECU is arranged to detect that the ignition sequence of the first and second engines corresponds to a predetermined ignition sequence, whereby the clutch is operable to connect the crankshafts of the first and second engines in a predetermined relative angular position. The ignition sequence and the relative angular position of the crankshafts are determined according to the method described above.

According to a further embodiment, the engine arrangement as described above may comprise a controllable clutch that is configured to be partially actuated in order to start the second engine. The controllable clutch is further configured to be disengaged when a total output torque of the first and second engines is below a predetermined limit.

The invention also relates to a vehicle comprising an engine arrangement as described in the above examples.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

DETAILED DESCRIPTION OF DRAWINGS

Figure 1:
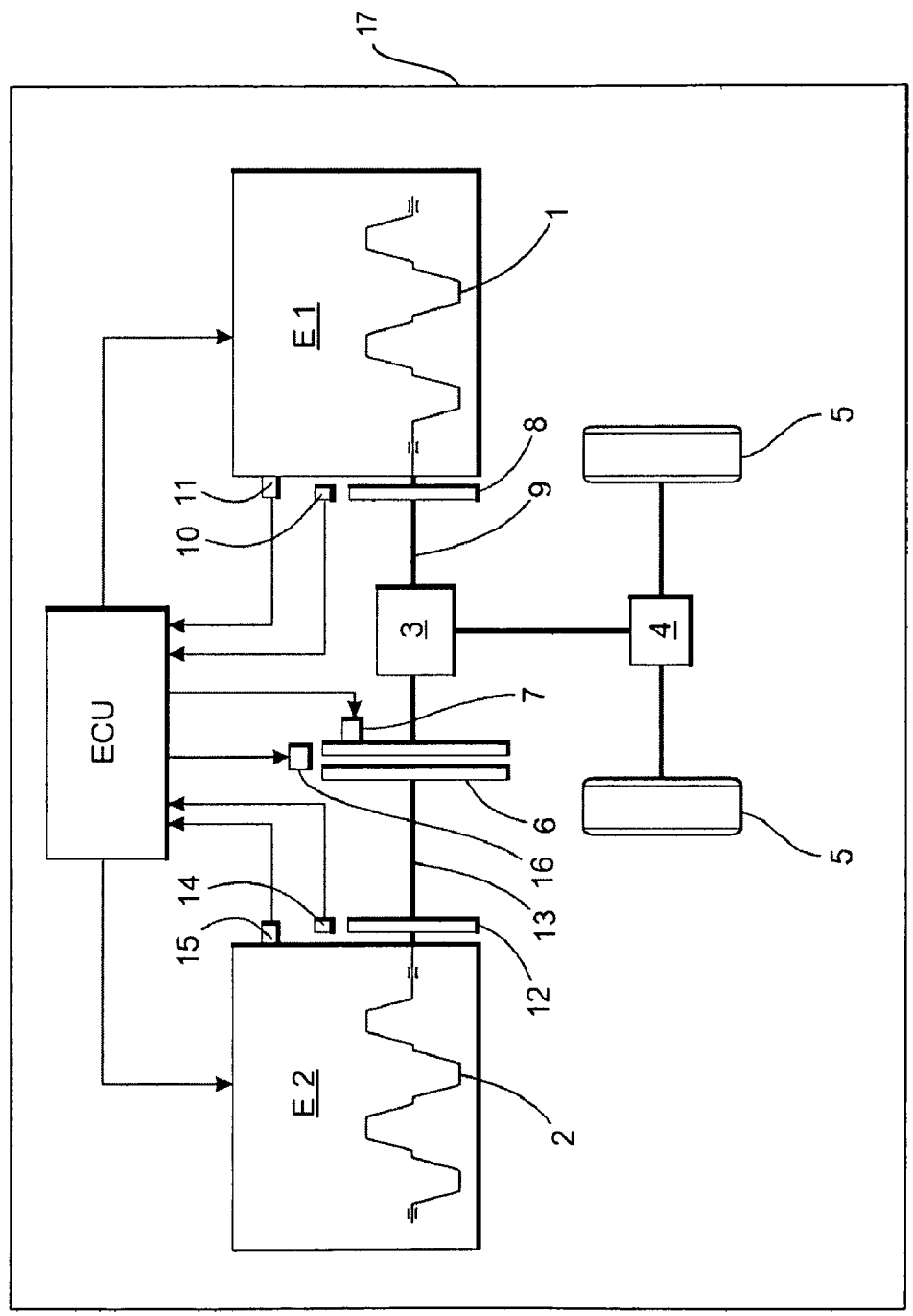
FIG. 1 shows a schematic illustration of an engine arrangement according to one embodiment of the invention.

FIG. 1 shows a schematic illustration of an engine arrangement according to one embodiment of the invention. The figure shows a front wheel drive engine arrangement comprising a first and a second internal combustion engine E1, E2, wherein each engine comprises a respective crankshaft 1, 2. In this example, each engine E1, E2 comprises four cylinders with pistons connected to the respective crankshaft 1, 2. The engines are mounted in an in-line, transverse configuration in a vehicle 17. An electronic control unit, which may be an engine control unit, (hereafter referred to as ECU) is arranged to control the first and second engines E1, E2, and is connected to sensors monitoring a number of operating parameters for the engines. The ECU transmits control signals to control the first and the second engines E1, E2. The crankshaft 1 of the first engine E1 is connected to a powertrain, which may include a gear unit 3 and a gear box 4, for transmitting torque to a pair of driving wheels 5. The gear unit 3 is provided with a bevel gear, or a similar gearing, for transferring torque at right angles from the first crankshaft 1 to the gear box 4. The crankshaft 2 of the second engine E2 is connected to the gear unit 3 via a controllable friction clutch 6. The friction clutch 6 is actuated by an actuator 7 controlled by the ECU. The friction clutch 6 is moved, in response to the actuator 7, into a position forming a driving or slipping interconnection between the second crankshaft 2 and the gear unit 3 connected to the first crankshaft 1. The actuator 7 also moves the friction clutch 6 to disconnect the second crankshaft 2 from the transmission.

Each engine includes an engine block to which a cylinder head is attached. An ignition system comprises igniters, such as spark plugs, which communicate with a corresponding combustion space in each cylinder. Valve members control the supply of fuel and discharge of exhaust gases of the combustion process to develop a force on pistons, each piston being coupled by a connecting rod to a crankshaft of a respective engine. The igniters for the first engine are controlled by a distributor system that is coupled to a battery through actuation of an ignition switch. A fuel supply system is provided for supplying fuel to the individual cylinders of the first and second engines E1, E2. A first flywheel 8 is mounted on a first drive shaft 9 between the first crankshaft 1, and the transmission (which may be one or more of 3 and 4) or the gearbox 4. A first position sensor 10 is located at the outer periphery of the first flywheel 8 for measuring the instantaneous angular position of the flywheel 8 and the first crankshaft 1. A second position sensor 11 is located adjacent a camshaft (not shown) for said first engine E1 for measuring the instantaneous angular position of the camshaft. Similarly, a second flywheel 12 is mounted on a second drive shaft 13 between the second crankshaft 2 and the friction clutch 6. A third position sensor 14 is located at the outer periphery of the second flywheel 12 for measuring the instantaneous angular position of the flywheel 12 and the second crankshaft 2. A fourth position sensor 15 is located adjacent a camshaft (not shown) for said second engine E2 for measuring the instantaneous angular position of the camshaft.

An electric starter motor (not shown) has a pinion that is moved into and out of engagement with the teeth on the outer periphery of the first flywheel 8 and is connected to start the first engine E1 when the ignition switch is actuated. These parts are standard components used in internal combustion engines and will not be described in detail. Said components are controlled by the ECU.

In operation, the starter motor is used to start the first engine E1 in the usual manner. The first engine E1 is used for powering the vehicle 17 when the demand for torque is relatively low. To achieve maximum fuel economy during this mode of operation, the second engine E2 is maintained switched off. When the power requirement cannot be met by the torque output by the first engine E1, the friction clutch 6 is energized by actuation of the actuator 7. At the same time, the ECU will actuate the ignition system and fuel injection system of the second engine E2. In order to avoid or at least minimize a sudden jerk in the transmission during start-up of the second engine E2, the ECU initiates a partial actuation, allowing the friction clutch 6 to slip while the crankshaft 2 of the second engine E2 is accelerated from standstill. Thus, in one example, the first and second crankshafts may be partially coupled with the clutch. The ECU will, if required, increase the torque output of the first engine E1 to compensate for the loss of output torque during the start of the second engine E2. The ECU will monitor at least one engine-related parameter for the second engine E2, in order to disengage the controllable friction clutch 6 when a total output torque of the first and second engines E1, E2 is below a predetermined limit.

Thus, the first and second crankshafts may be decoupled. The second engine E2 will then be accelerated under its own power towards the engine speed of the first engine E1, under the control of the ECU.

The ECU controls the second engine E2 to minimize the difference between the first and the second engine speed, until the engines are running at the same or substantially the same engine speed. Subsequently, the ECU uses the output signals from the first and second sensors 10, 11 and the third and fourth sensors 14, 15, to respectively control the relative angular position of the first and second crankshafts 1, 2. This is done using the ignition timing sequence of the respective first and second engines E1, E2, which sequence is controlled by their respective camshafts. In one example, the angular position of the crankshafts is controlled based on the ignition timing sequence information so that when the crankshafts are coupled, the desired overall ignition sequence of the first and second engines is obtained.

The relative angular position of the crankshafts of the first and second engines E1, E2 is determined using the first and third position sensors 10, 14. The second and fourth position sensors 11, 15 are used to determine the relative angular position of the camshafts of the first and second engines E1, E2. In a four-cycle Otto or Diesel engine, the camshaft will rotate at half the speed of the crankshaft. The output signals from the position sensors 10, 11, 14, 15 are transmitted to the ECU, where the signals are compared and processed using a software algorithm to find the optimal local alignment between the two output signals. In this case, the optimal alignment is the synchronization of the two crankshafts at a relative angle of 720°. The relative angle of 720° corresponds to two complete relative revolutions of the crankshafts, which corresponds to a relative position where the first and second engines E1, E2 are firing alternately. Processing the signals using a software algorithm provides a "fused" sensor signal representing a 0-720° value. The ECU can then control the second engine E2 in order to synchronize the first and second crankshafts 1, 2 at a relative angle of 720°. When the desired relative angular position is detected, the clutch 6 is actuated to connect the engines.

When the ignition timing sequence of the first and second engines corresponds to the desired ignition timing sequence of the connected first and second engines, the controllable friction clutch 6 is actuated to connect the first and second crankshafts 1, 2 of the first and second engines E1, E2 in the predetermined relative angular position. Thus, in one example, the first and second crankshafts 1, 2 may be recoupled.

As indicated in FIG. 1, a mechanical connecting means 16 can be used to secure, or lock up the driving connection between the two crankshafts 1, 2. A mechanical connecting means may be a mechanical connector (e.g., a ratchet), described in more detail below.

Figure 2:
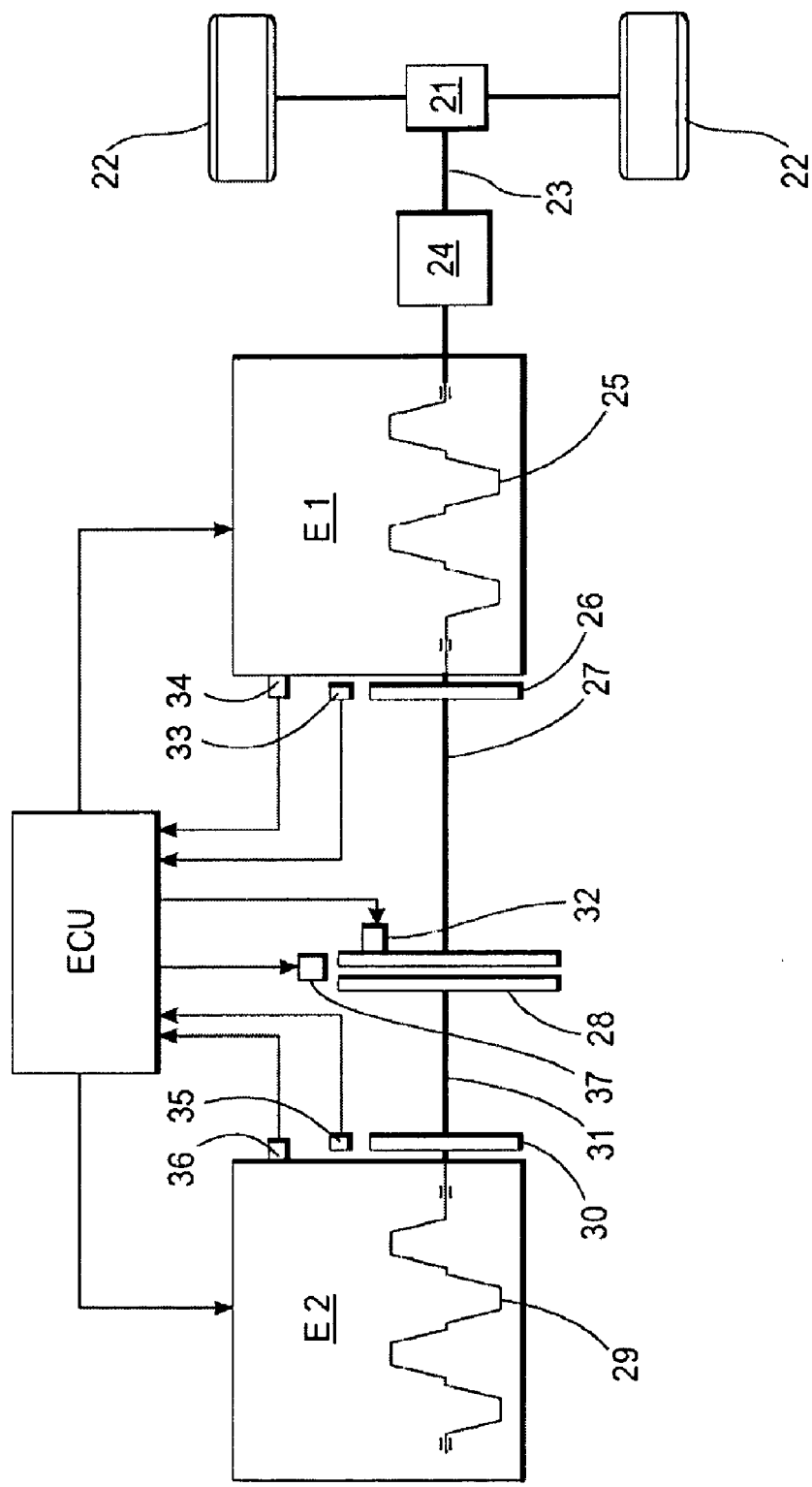
FIG. 2 shows a schematic illustration of an engine arrangement according to an alternative embodiment of the invention.
Figure 3:
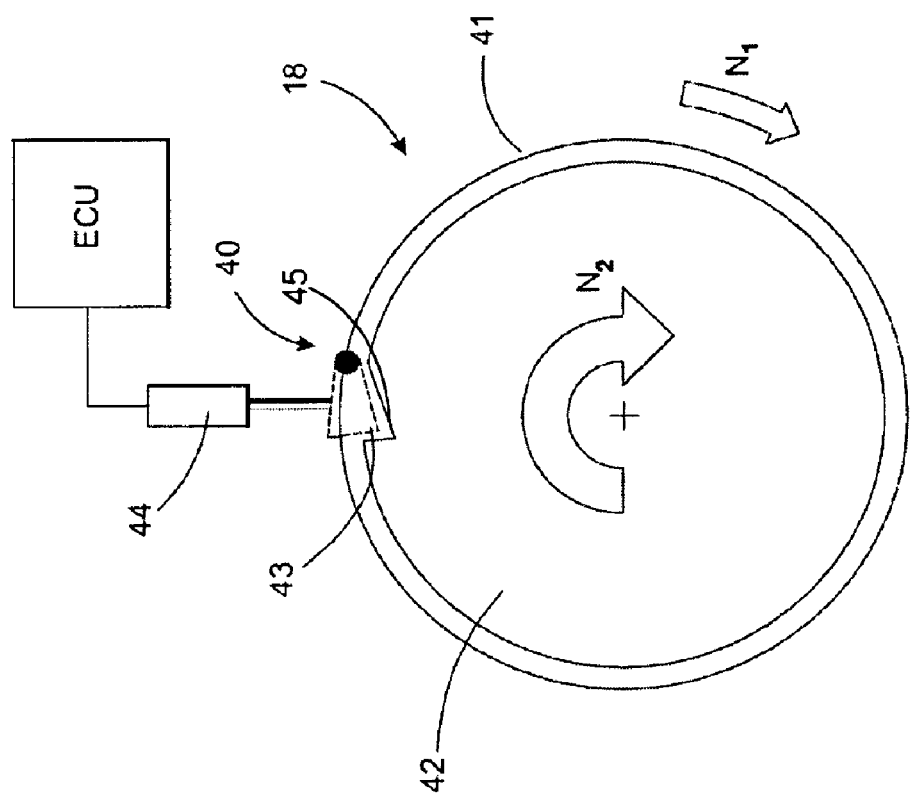
FIG. 3 shows an end view of a clutch unit for an engine arrangement as shown in FIG. 1 or 2.

FIG. 3 shows an end view of one alternative clutch unit for the engine arrangements as shown in FIGS. 1 and 2. As shown in FIG. 3, a clutch unit 40 comprising a mechanical connecting means is provided with a ratchet 43 mounted on a first clutch part 41 attached to the crankshaft of the first engine. A second clutch part 42 attached to the crankshaft of the second engine is provided with a notch 45. In this case, the crankshafts are connected using a controllable ratchet that is actuated when a condition, such as the following, is met: the speed difference between the first and second crankshafts is below a predetermined value and the relative angular difference between the crankshafts is less than 360°. A controllable actuator 44 is controlled by the ECU to release the ratchet. In one example operation, the ratchet is released by the actuator when said condition is fulfilled, to lock up with the notch. As soon as the two crankshafts are located at a relative angle of 720° the ratchet will lock up with the notch. This is sensed by the ECU, which will actuate the friction clutch to secure the connection between the crankshafts. Alternatively, the crankshafts may be connected using a ratchet of the overrun type that is in constant operation. The latter alternative can be used if it is desired to achieve a relative angle of 360° between the crankshafts.

According to a first example the mechanical connecting means may be configured to connect the crankshafts no later than at the same time as the actuation of the friction clutch. A suitable connecting means for this purpose is a mechanically or electrically controllable ratchet. In the first and second examples, the mechanical connecting means is used to assist the ECU in locating the first and second crankshafts 1, 2 in a desired relative angular position. Preferably, the ratchet is only actuated when the relative angular difference between the crankshafts is less than 360°, that is, within the window for achieving a relative angle of 720° between the crankshafts.

According to a second example, the mechanical connecting means may be arranged to connect the crankshafts subsequent to the actuation of the friction clutch. A suitable connecting means for this purpose is a mechanically or electrically controllable ratchet or dog clutch.

Preferably, the start-up process should be sufficiently fast to avoid a noticeable delay in response from the point of view of the driver. An acceptable period of time from the initial request for more torque from the driver until the connection of the second engine to supply additional torque is 0.1-0.5 seconds.

FIG. 2 shows a schematic illustration of an engine arrangement according to an alternative embodiment of the invention. The figure shows a rear wheel drive engine arrangement comprising a first and a second internal combustion engine E1, E2. The powertrain for a vehicle is shown schematically and includes a differential 21 having oppositely-extending axle members delivering torque to wheel members 22 in a manner, per se, well known in the art. The differential assembly 21 is coupled by a drive shaft 23, to a transmission 24. The transmission can comprise a gearbox of any suitable type. The transmission 24 is coupled to one end of a first crankshaft 25 of the first internal combustion engine E1. A flywheel 26 is mounted on an input shaft 27 between a clutch 28 and the first crankshaft 25. An electric starting motor (not shown) can be moved into and out of engagement with teeth on the outer periphery of the flywheel 26 in order to start the first engine E1. A second internal combustion engine E2 includes a second crankshaft 29. A flywheel 30 is mounted on an output shaft 31 between the clutch 28 and the second crankshaft 29. The friction clutch 28 includes a first clutch member mounted for sliding movement on the input shaft 27 and a second clutch member mounted on the output shaft 31 in a stationary manner. The first clutch member is moved in response to an actuator 32 into a position forming a drive interconnection between the first and second crankshafts 25, 29. The actuator 32 also moves the first clutch member to disconnect the crankshafts from the driving connection. Each engine E1, E2 can comprise a standard internal combustion engine of a type as described above. A first position sensor 33 is located at the outer periphery of the first flywheel 26 for measuring the instantaneous angular position of the flywheel 26 and the first crankshaft 25. A second position sensor 34 is located adjacent a camshaft (not shown) for said first engine E1 for measuring the instantaneous angular position of the said camshaft. Similarly, a third position sensor 35 is located at the outer periphery of the second flywheel 30 for measuring the instantaneous angular position of the said flywheel 30 and the second crankshaft 29. A fourth position sensor 36 is located adjacent a camshaft (not shown) for said second engine E2 for measuring the instantaneous angular position of the said camshaft.

In operation, the starter motor is used to start the first engine E1 in the usual manner. The first engine E1 is used for powering the vehicle when the demand for torque is relatively low. To achieve maximum fuel economy during this mode of operation, the second engine E2 is maintained switched off. When the power requirement cannot be met by the torque output by the first engine E1, the friction clutch 28 is energized by actuation of the actuator 32. At the same time, the ECU will actuate the ignition system and fuel injection system of the second engine E2. In order to avoid or, at least, minimize a sudden jerk in the transmission 24 during start-up of the second engine E2, the ECU initiates a partial actuation, allowing the friction clutch 28 to slip while the second crankshaft 29 of the second engine E2 is accelerated from standstill. The ECU will, if required, increase the torque output of the first engine E1 to compensate for the loss of output torque during the start of the second engine E2. The ECU will monitor at least one engine-related parameter for the second engine E2, in order to disengage the controllable friction clutch 28 when the total output torque of the first and second engines E1, E2 is below a predetermined limit. The second engine E2 will then be accelerated under its own power towards the engine speed of the first engine E1, under the control of the ECU.

The ECU controls the second engine E2 to minimize the difference between the first and the second engine speed, until the engines are running at the same or substantially the same engine speed. Subsequently the ECU controls the relative angular position of the first and second crankshafts 25, 29 using the ignition timing sequence of the first and second engines, the sequence being controlled by the respective camshafts.

The relative angular position of the crankshafts of the first and second engines E1, E2 is determined using the first and third position sensors 33, 35. The second and fourth position sensors 34, 36 are used to determine the relative angular position of the camshafts of the first and second engines E1, E2. In a four-cycle Otto or Diesel engine, the camshaft will rotate at half the speed of the crankshaft. The output signals from the position sensors 33, 34, 35, 36 is transmitted to the ECU, where the signals are compared and processed using a software algorithm to find the optimal local alignment between the two output signals. In this case, the optimal alignment is the synchronization of the two crankshafts at a relative angle of 720°. The relative angle of 720° corresponds to two complete relative revolutions of the crankshafts, which corresponds to a relative position where the first and second engines E1, E2 are firing alternately. Processing the signals using a software algorithm provides a "fused" sensor signal representing a 0-720° value. The ECU can then control the second engine E2 in order to synchronize the first and second crankshafts 25, 29 at a relative angle of 720°. When the desired relative angular position is detected the clutch 28 is actuated to connect the engines.

When the ignition timing sequence of the first and second engines corresponds to the desired ignition timing sequence of the connected first and second engines, the controllable friction clutch 28 is actuated to connect the crankshafts 25, 29 of the first and second engines E1, E2 in the predetermined relative angular position. As described in connection with FIG. 1, a mechanical connecting means 37 can be used to secure, or lock up the driving connection between the two crankshafts.

Figure 4:
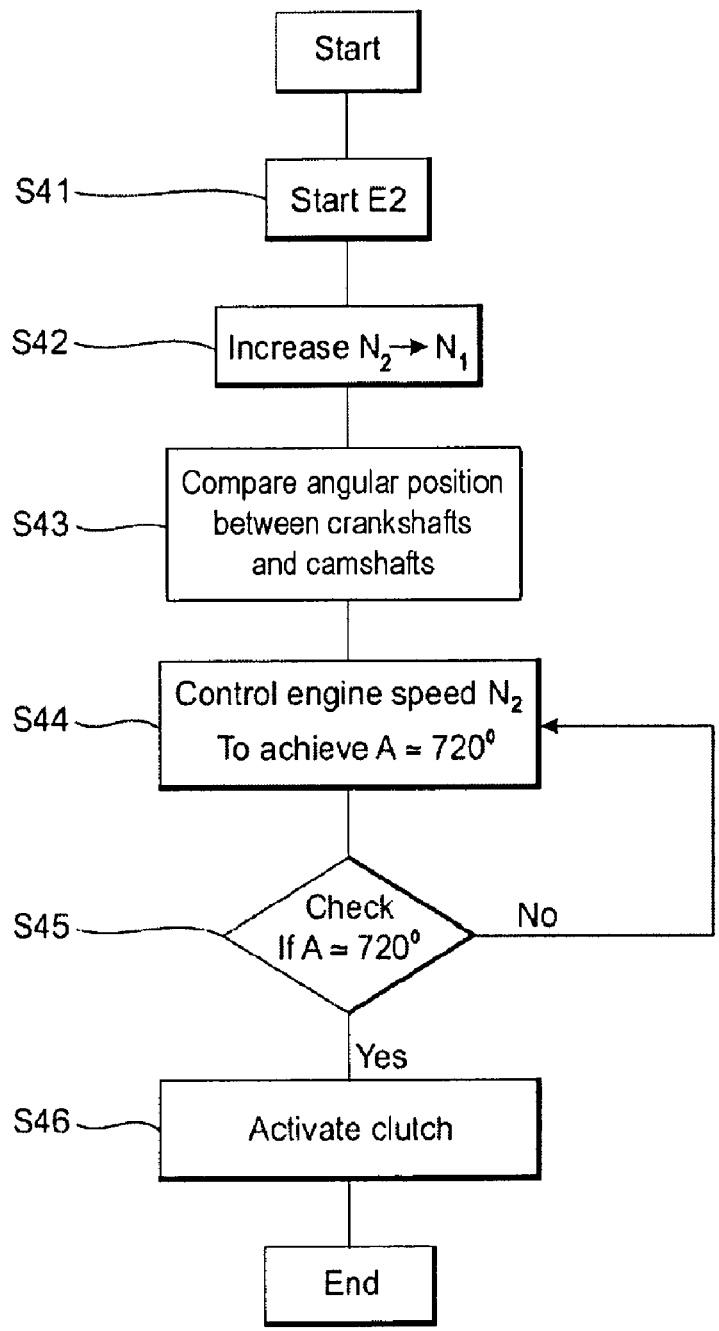
FIG. 4 shows a flow chart illustrating a method of operating an engine arrangement as shown in FIG. 1 or 2.

FIG. 4 shows a flow chart illustrating a method of operating an engine arrangement as shown in FIG. 1 or 2. In use, the arrangement shown in either of FIG. 1 or 2 carries out the steps described below. During low load operation, the vehicle is powered by the first engine E1. The ECU will continuously monitor any actions taken by the driver that would affect the required torque output from the engine or engines. Should the driver perform an action such as depressing the accelerator and/or down-shifting gears in preparation for an acceleration, then this is detected by the ECU. Detecting a demand for output torque exceeding an available output torque from the first engine E1 will initiate the procedure outlined in FIG. 4.

When the procedure is started, the ECU will, in a first step S41, issue a command to start the second engine E2. This command will actuate the friction clutch, which will be controlled to impart sufficient torque from the first to the second engine to start said second engine. The clutch is then disengaged, and the ECU will then control the second engine E2 to increase its engine speed $N_2$ towards the engine speed $N_1$ of the first engine E1. During this step S42 the ECU will continuously compare the first and second engine speeds $N_1$, $N_2$ and control the second engine to minimize the difference between the first and the second engine speed $N_1$, $N_2$. As the difference between the engine speeds is reduced, the ECU performs a comparison S43 between the relative angular position of the crankshafts of the first and second engines, using the ignition sequence and the relative angular position of the camshafts of the first and second engines, using input signals from a number of position signals. The ECU will process the signals using a software algorithm to find the relative angle between the crankshafts in relation to a desired relative angle A of 720°.

In step S44 the ECU controls the relative angular position of the crankshafts of the first and second engines using the sensed crankshaft and camshaft positions of the respective first and second engines. The ECU controls the operation of the second engine E2 to achieve the desired condition (e.g., a relative angular position A of approximately 720°). When the relative angular position is detected to be 720° in step S45, the two crankshafts are in synchronization and the engines are operated with an alternating ignition timing sequence.

When it is detected at S46 that the engines are synchronized, the ECU controls the controllable friction clutch to lock up the crankshafts of the first and second engines. The control sequence is then ended and the ECU will monitor the required torque output to determine if the first and second engines should remain connected or if the clutch should be disconnected.

Figure 5:
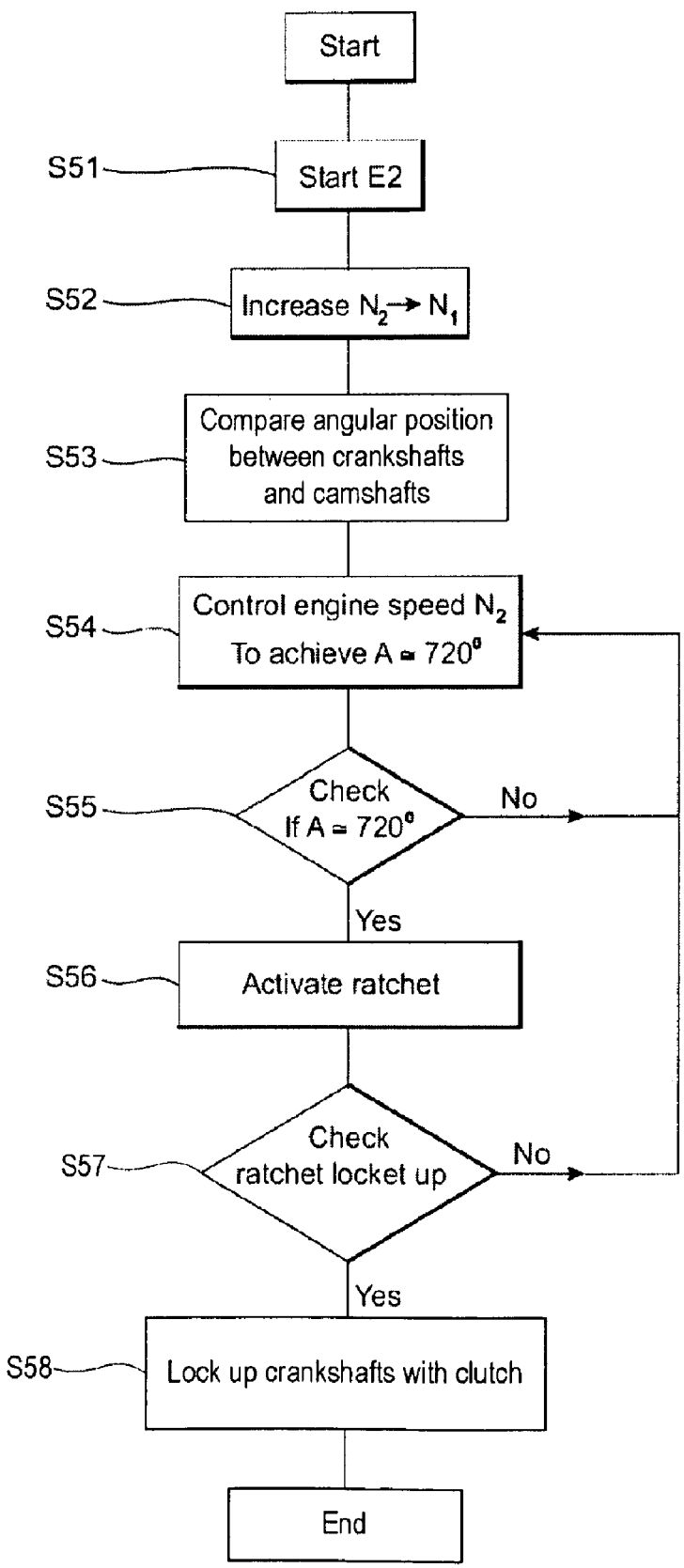
FIG. 5 shows a flow chart illustrating an alternative method of operating an engine arrangement as shown in FIG. 1 or 2.

FIG. 5 shows a flow chart illustrating an alternative method of operating an engine arrangement as shown in FIG. 1 or 2. In use, the arrangement shown in either of FIG. 1 or 2 carries out the steps described below. Initially the procedure corresponds to that of FIG. 4 described above. During low load operation, the vehicle is powered by the first engine E1. The ECU will continuously monitor any actions taken by the driver that would affect the required torque output from the engine or engines. Should the driver perform an action such as depressing the accelerator and/or down-shifting gears in preparation for an acceleration, then this is detected by the ECU. Detecting a demand for output torque exceeding an available output torque from the first engine E1 will initiate the procedure outlined in FIG. 5.

When the procedure is started, the ECU will, in a first step S51, issue a command to start the second engine E2. This command will actuate the friction clutch, which will be controlled to impart sufficient torque from the first to the second engine to start said second engine. The clutch is then disengaged, and the ECU will then control the second engine E2 to increase its engine speed $N_2$ towards the engine speed $N_1$ of the first engine E1. During this step S52 the ECU will continuously compare the first and second engine speeds $N_1$, $N_2$ and control the second engine to minimize the difference between the first and the second engine speed $N_1$, $N_2$. As the difference between the engine speeds is reduced, the ECU performs a comparison, at S53, between the relative angular position of the crankshafts and between the relative angular position of the camshafts of the first and second engines and the ignition sequence (represented by relative angular position of the camshafts of the first and second engines), using input signals from a number of position signals. The ECU will process the signals using a software algorithm to find the relative angle between the crankshafts in relation to a desired relative angle A of 720°.

In step S54 the ECU controls the relative angular position of the crankshafts of the first and second engines using the sensed crankshaft and camshaft positions of the respective first and second engines. The ECU controls the operation of the second engine E2 to achieve the desired condition.

In step S55 the ECU checks if the relative angular position of the crankshafts of the first and second engines differs by less than 360°, using the sensed crankshaft and camshaft positions of the respective first and second engines. When the relative angular positions differs by less than 360°, then the crankshafts are within the window for achieving a relative angle of 720°. If the difference $\Delta A > 360°$, then the procedure returns to step S54 for further engine control. If the difference $\Delta A < 360°$, then the mechanical connecting means, in this case an overrun ratchet, is activated in step S56.

In step S57 the ECU will check if the ratchet has locked up with the notch, as described in connection with FIG. 3. If no lock-up is detected then the procedure returns to step S54 for further engine control. Steps S54 to S57 are repeated until the ECU detects that the ratchet has locked up.

When it is detected that lock-up is achieved, the engines are synchronized and the ECU controls the controllable friction clutch to lock up the crankshafts of the first and second engines in step S58.

The control sequence is then ended and the ECU will monitor the required torque output to determine if the first and second engines should remain connected or if the clutch should be disconnected.

The invention is not limited to the above examples, but may be varied freely within the scope of the appended claims.

The invention claimed is:

1. An engine arrangement comprising:
   a first internal combustion engine;
   a second internal combustion engine, wherein each of the first and second engines comprises a crankshaft and at least one cylinder with a piston connected to said crankshaft;
   a controllable clutch arranged between the crankshafts;
   an engine control unit connected to and controlling the first and second engines; and
   sensors for monitoring at least one operating parameter for the engines, wherein:
   the second engine is configured to be started when a demand for output torque exceeding an available output torque from the first engine is detected;
   the engine control unit is configured to compare a first engine speed of the first engine and a second engine speed of the second engine, and to control the second engine to minimize the speed difference between the first and the second engine speed, and to control the relative angular position of the first and second crankshafts in relation to a sensed crankshaft position and the ignition timing sequence of the respective first and second engines; and wherein the controllable friction clutch is configured to be actuated to lock up the crankshafts of the first and second engines in at least one predetermined relative angular position.

2. The engine arrangement of claim 1, wherein the arrangement further comprises a mechanical connecting means configured to connect the crankshafts of the first and second engines in a predetermined relative angular position.

3. The engine arrangement of claim 2, wherein the ratchet connecting the crankshafts is an overrun ratchet.

4. The engine arrangement of claim 2, wherein the ratchet connecting the crankshafts is a controllable ratchet that is configured to be actuated when the speed difference is below a predetermined value and the relative angular difference between the crankshafts is less than 360°.

5. The engine arrangement of claim 1, wherein the control unit is configured to detect that the ignition sequence of the first and second engines corresponds to a predetermined ignition sequence, and wherein the clutch is operable to connect the crankshafts of the first and second engines in a predetermined relative angular position when it is detected that the ignition sequence of the first and second engines corresponds to a predetermined ignition sequence.

6. The engine arrangement of claim 1, wherein the controllable clutch is a friction clutch.

7. The engine arrangement of claim 1, wherein the controllable clutch is configured to be partially actuated in order to start the second engine.

8. The engine arrangement of claim 7, wherein the controllable clutch is configured to be disengaged when a total output torque of the first and second engines is below a predetermined limit.

9. A method for operating an engine arrangement with a first internal combustion engine and a second internal combustion engine in a vehicle, the method comprising:

partially coupling a first crankshaft of the first internal combustion engine in the vehicle with a second crankshaft of the second internal combustion engine in the vehicle to start the second internal combustion engine, where the first crankshaft and second crankshaft are partially coupled with a clutch;

decoupling the first crankshaft and the second crankshaft when the second engine is operating under its own power; and coupling the first crankshaft and the second crankshaft, where the first and second crankshafts are coupled with the clutch when a speed difference between the first and second crankshafts is below a predetermined value and a relative angular position between the first and second crankshafts is less than 360°.

10. A method for controlling an engine arrangement including a first and a second internal combustion engine, each engine including a crankshaft and at least one cylinder with a piston connected to said crankshaft, a controllable friction clutch arranged between the crankshafts, an engine control unit connected to and configured to control the first and second engine, and sensors for monitoring at least one operating parameter for the engines, the method being carried out when the first engine is operated, the method comprising the steps of:

detecting a demand for output torque exceeding an available output torque from the first engine;

starting the second engine and increasing its engine speed towards the engine speed of the first engine;

comparing a first engine speed of the first engine and a second engine speed of the second engine;

controlling the second engine to minimize the difference between the first and the second engine speed;

comparing a relative angular position of the crankshafts of the first and second engines and a relative angular position of the camshafts of the first and second engines;

controlling the relative angular position of the crankshafts of the first and second engines using a sensed crankshaft position and the ignition timing sequence of the respective first and second engines; and controlling the controllable friction clutch to lock up the crankshafts of the first and second engines in at least one predetermined relative angular position.

11. The method of claim 10, wherein connecting the crankshafts of the first and second engines in a predetermined relative angular position includes using a mechanical connecting means.

12. The method of claim 11, wherein connecting the crankshafts includes using an overrun ratchet.

13. The method of claim 11, wherein connecting the crankshafts includes using a controllable ratchet that is actuated when the speed difference between the first and second crankshafts is below a predetermined value and the relative angular difference between the first and second crankshafts is less than 360°.

14. The method of claim 10, further comprising determining that the ignition sequence of the first and second engines corresponds to a predetermined ignition sequence of the combined first and second engines prior to connecting the crankshafts of the first and second engines in a predetermined relative angular position.

15. The method of claim 10, wherein comparing the relative angular positions of the crankshafts and the camshafts includes using a software algorithm.

16. The method of claim 10, wherein controlling the controllable friction clutch includes locking up the crankshafts in a relative angular position of 720°.

17. The method of claim 10, wherein starting the second engine includes partially actuating the controllable clutch.

18. The method of claim 17, further comprising increasing the torque output of the first engine during start-up to compensate for a loss in torque output during start-up of the second engine.

19. The method of claim 17, further comprising disengaging the controllable clutch when a total output torque of the first and second engines is below a predetermined limit.

* * * * *